(12) United States Patent
Osada (10) Patent No.: US 6,910,902 B2
(45) Date of Patent: Jun. 28, 2005

(54) SHUNT FOR SQUIB HAVING AN IMPROVED SECURING MECHANISM

(75) Inventor: Tsuyoshi Osada, Novi, MI (US)

(73) Assignee: J. S. T. Mfg. Co., Ltd., Osaka (JP)

( * ) Notice: Subject to any disclaimer, the term of this patent is extended or adjusted under 35 U.S.C. 154(b) by 0 days.

(21) Appl. No.: 10/713,955

(22) Filed: Nov. 14, 2003

(65) Prior Publication Data

US 2004/0097116 A1 May 20, 2004

(30) Foreign Application Priority Data

Nov. 18, 2002 (JP) .......................................... 2002-334205

(51) Int. Cl.$^7$ ............................................. H01R 29/00
(52) U.S. Cl. ...................................... 439/188; 439/352
(58) Field of Search ................................ 439/188, 747, 439/746, 351–353

(56) References Cited

U.S. PATENT DOCUMENTS

| | | | |
|---|---|---|---|
| 4,428,641 A | * 1/1984 | Flachbarth et al. | 439/572 |
| 5,064,973 A | 11/1991 | Zinn et al. | |
| 5,200,574 A | * 4/1993 | Cunningham et al. | 102/530 |
| 5,275,575 A | 1/1994 | Cahaly et al. | |
| 5,376,023 A | * 12/1994 | Matsuyama | 439/746 |
| 5,827,083 A | 10/1998 | Dullin | |
| 5,938,465 A | 8/1999 | Fox, Sr. | |
| 6,234,814 B1 | * 5/2001 | Hirschmann | 439/188 |
| 6,250,952 B1 | * 6/2001 | Shiga et al. | 439/466 |
| 6,341,972 B1 | 1/2002 | Odoerfer | |
| 6,419,510 B2 | 7/2002 | Shiraki et al. | |
| 6,544,060 B2 | * 4/2003 | Wakui et al. | 439/188 |
| 6,699,059 B2 | * 3/2004 | Nagamine et al. | 439/352 |

FOREIGN PATENT DOCUMENTS

| | | |
|---|---|---|
| DE | 19617792 | 11/1997 |
| DE | 19833223 | 1/1999 |
| EP | 0828321 | 3/1998 |
| EP | 1130692 | 9/2001 |
| EP | 1184232 | 3/2002 |
| EP | 1207591 | 5/2002 |
| GB | 2318924 | 5/1998 |
| JP | 6-208867 | 7/1994 |
| JP | 2002151181 | 5/2002 |
| TW | 129094 | 2/1990 |
| WO | WO 99/08062 | 2/1999 |

OTHER PUBLICATIONS

Bolen et al.; U.S. patent application Publication No. 2002/0146942 A1, Publication Date: Oct. 10, 2002, entitled: "Unlock Proof Squib Connector", cover sheet, 2 sheets of drawings and pp. 1 to 3.

\* cited by examiner

Primary Examiner—Hae Moon Hyeon
(74) Attorney, Agent, or Firm—W. F. Fasse; W. G. Fasse (57) ABSTRACT

The objective is to ensure the inflator yields a force sufficient to hold the shunt, prevent the shunt from coming off the inflator, reduce the force required to insert the shunt into the socket, and enhance the workability of assembling the shunt into the socket. The shunt body is provided with a short-circuit piece which short-circuits the pair of pins of the squib, and the shunt body is provided with a protrusion being formed of a flexible material, the root end of the protrusion is provided on the outer face of the shunt body, the protrusion extends from the root end thereof in a direction tilting toward the outside from the shunt body at an angle within 90 degrees to a direction being parallel to the central axis of the shunt body and heading toward the top thereof, and it is arranged that when the top end of the protrusion is pushed toward the connection hole of the shunt body, the protrusion will undergo deformation by bending, and when the shunt body fits into the socket, the protrusion will restitute to protrude in the fitting concave.

18 Claims, 9 Drawing Sheets

SHUNT FOR SQUIB HAVING AN IMPROVED SECURING MECHANISM

BACKGROUND OF THE INVENTION

1. Field of the Invention

An inflator for feeding a gas into an airbag to deploy it is provided with a squib (heat generator). To supply this squib with electric energy, a female connector is connected to a pair of pins of the squib. The present invention relates to a shunt, which short-circuits the pair of pins of the squib till the female connector is connected to the pair of pins.

2. Related Art

A shunt is known as a shunt of this kind, the shunt fits into a socket opening in the surface of a housing of an inflator and concaving from the opening in a cylindrical form into the housing and short-circuits a pair of pins of a squib rising from the bottom of the socket. The shunt comprises a shunt body formed into a cylinder to fit into the socket, and a short-circuit piece provided to the shunt body. When the shunt body is fitted into the socket, the short-circuit piece will short-circuit the pair of pins of the squib to prevent any malfunction of the squib. When this inflator is assembled into a vehicle and the female connector is fitted into the shunt, contacts of the female connector will connect to the pair of pins of the squib and the short-circuit piece will be pushed by the female connector to move away from the pair of pins, and this will activate the operating circuit of the squib, enabling the inflator. The socket that is disclosed in official publication is provided with a fitting concave, which concaves from the inner circumferential face, in the middle of the depth direction, to the outer side of the radial direction. A pawl being provided on a fitting piece of a female connector fits into this fitting concave, and this holds the female connector in the inflator (for example, please refer to Japanese Patent Unexamined Publication 2002-151181).

A structure for holding such a shunt in a socket may be to provide the outer circumferential face of the shunt body with a swelled part bulging out to fit into the fitting concave. In that case, when the shunt is fitted into the socket, the swelled part will shift toward the bottom of the socket while being pushed by the inner circumferential face of the socket toward the center of the shunt. And when the swelled part reaches the depth of the fitting concave, the swelled part will restitute and fit into the fitting concave. In that case, the depth of fitting of the swelled part into the fitting concave is a very small dimension because it is generated by the restitution of the swelled part and the shunt body from their states of compression deformation. Moreover, the swelled part is gnawed (i.e. fretted or chafed) by friction against the inner circumferential face of the socket while the shunt is moved toward the bottom of the socket, and this reduces the depth of fitting of the swelled part into the fitting concave. As a result, the inflator cannot provide a sufficient force to hold the shunt, causing troubles such as inadvertent disconnection of the shunt from the inflator during transportation. Moreover, if the depth of fitting of the swelled part in the fitting concave is small, the feel or response at the time of fitting is small or the so-called sense of clicking is wanted, and it is hard to confirm the successful fitting. This may confuse one to think that the parts are fitted together although they are only in a half-fitted or incompletely-fitted state. In such a case, the inflator hardly generates force to hold the shunt and the shunt can come out of the inflator easily. Furthermore, when the shunt is to be fitted into the socket, the required insertion force will be large due to the friction between the swelled part and the inner circumferential face of the socket, impairing the workability of assembly.

SUMMARY OF THE INVENTION

The present invention was made in view of the above-mentioned points, and its object is to provide the outer face of the shunt body with a protrusion protruding obliquely, make the protrusion to be bent and deformed and shunt inward when the shunt is inserted into the socket, and make the protrusion restitute and protrude in the fitting concave when the shunt body is once fitted into the socket, so as to ensure the inflator yields a force sufficient to hold the shunt, prevent the shunt from coming off the inflator, reduce the force required to insert the shunt into the socket, and enhance the workability of assembling the shunt into the socket.

To accomplish the above-mentioned objective, the shunt for squib according to the present invention is a shunt that fits into a socket opening in the surface of a housing of an inflator, concaving from the opening in a cylindrical form into the housing and having a fitting concave concaving from the inner circumferential face, in the middle of the depth direction, to the outer side of the radial direction, and short-circuits a pair of pins of a squib rising from the bottom of the socket, and the shunt for squib comprises a shunt body being formed into a cylinder to fit into the socket and being provided, at the center thereof, with a through connection hole into which the pair of pins of the squib enter from the bottom side and the female connector fits from the top side, a short-circuit piece being provided to the shunt body to contact the pair of pins of the squib when the shunt body is fitted into the socket and to be pushed by the female connector to move away from the pair of pins of the squib when the female connector is fitted into the connection hole, and a protrusion being formed of an elastic material and provided on the shunt body, and the root end of the protrusion is provided on the outer face of the shunt body, the protrusion extends from the root end thereof in a direction tilting toward the outside from the shunt body at an angle within 90 degrees to a direction being parallel to the central axis of the shunt body and heading toward the top thereof, and it is arranged that when the top end of the protrusion is pushed toward the connection hole of the shunt body, the protrusion will undergo deformation by bending, and when the shunt body fits into the socket, the protrusion will restitute to protrude in the fitting concave.

When the shunt body is fitted into the socket, the pair of pins of the squib will enter the connection hole from the bottom side. As the short-circuit piece will contact both pins to short-circuit them, the squib will not function. When the female connector is fitted into the connection hole from the top side, the short-circuit piece will be pushed by the female connector to move away from the pair of pins, and the contacts of the female connector will connect to the pair of pins to activate the operating circuit of the squib, enabling the inflator.

To fit the shunt into the socket, when the shunt body is inserted into the socket, the top end of the protrusion will be pushed by the inner circumferential face of the socket toward the connection hole of the shunt body, and the protrusion will be bent and deformed to shunt toward the connection hole. In this case, as the protrusion is deformed by bending, greater displacement of the top ends thereof can be obtained by a small force when compared with a case wherein the swelled part and the shunt body are to be deformed by compression. Accordingly, when compared with a case wherein the swelled part is provided on the outer circumferential face of the shunt body, the frictional force working on the protrusion and the inner circumferential face of the socket is reduced. As a result, the force required to insert the shunt into the socket will be reduced, and the workability of fitting the shunt into the socket will be enhanced.

When the shunt body is fitted into the socket, the protrusion will restitute and protrude, with a sufficient length, in the fitting concave. Moreover, as the frictional forces working on the protrusion and the inner circumferential face of the socket are reduced, gnawing of the protrusion will be reduced. Accordingly, the depth of fitting between the protrusion and the fitting concave is sufficiently large, and in turn, the force of holding the shunt by the inflator is improved, and disconnection of the shunt from the inflator can be prevented reliably.

When the protrusion protrudes into the fitting concave, the top end of the protrusion will undergo a large deformation as the protrusion restitutes itself from a deformed state by bending. Hence a conspicuous response will be experienced with a clear sense of clicking. As a result, it is easier to verify that the protrusion has been fitted into the fitting concave; it will be hard to leave the fitting work half done or incomplete. Accordingly, the force of holding the shunt by the inflator is enhanced, and disconnection of the shunt from the inflator can be prevented reliably.

In the shunt for squib according to the present invention, the outer face of the shunt body is provided with a protrusion protruding obliquely, and when the shunt is inserted into the socket, the protrusion will be deformed by bending to shunt inward, and when the shunt body is fitted into the socket, the protrusion will restitute itself to protrude in the fitting concave. As a result, the depth of fitting between the protrusion and the fitting concave is sufficiently large, and fitting of the protrusion into the fitting concave can be verified easily with a sense of clicking to prevent incomplete fitting. Accordingly, the force of the inflator to hold the shunt is enhanced, and disconnection of the shunt from the inflator can be prevented reliably. Moreover, the force required to insert the shunt into the inflator is reduced, and the workability of fitting the shunt into the inflator is enhanced.

PREFERRED EMBODIMENTS OF THE INVENTION

Figure 1:
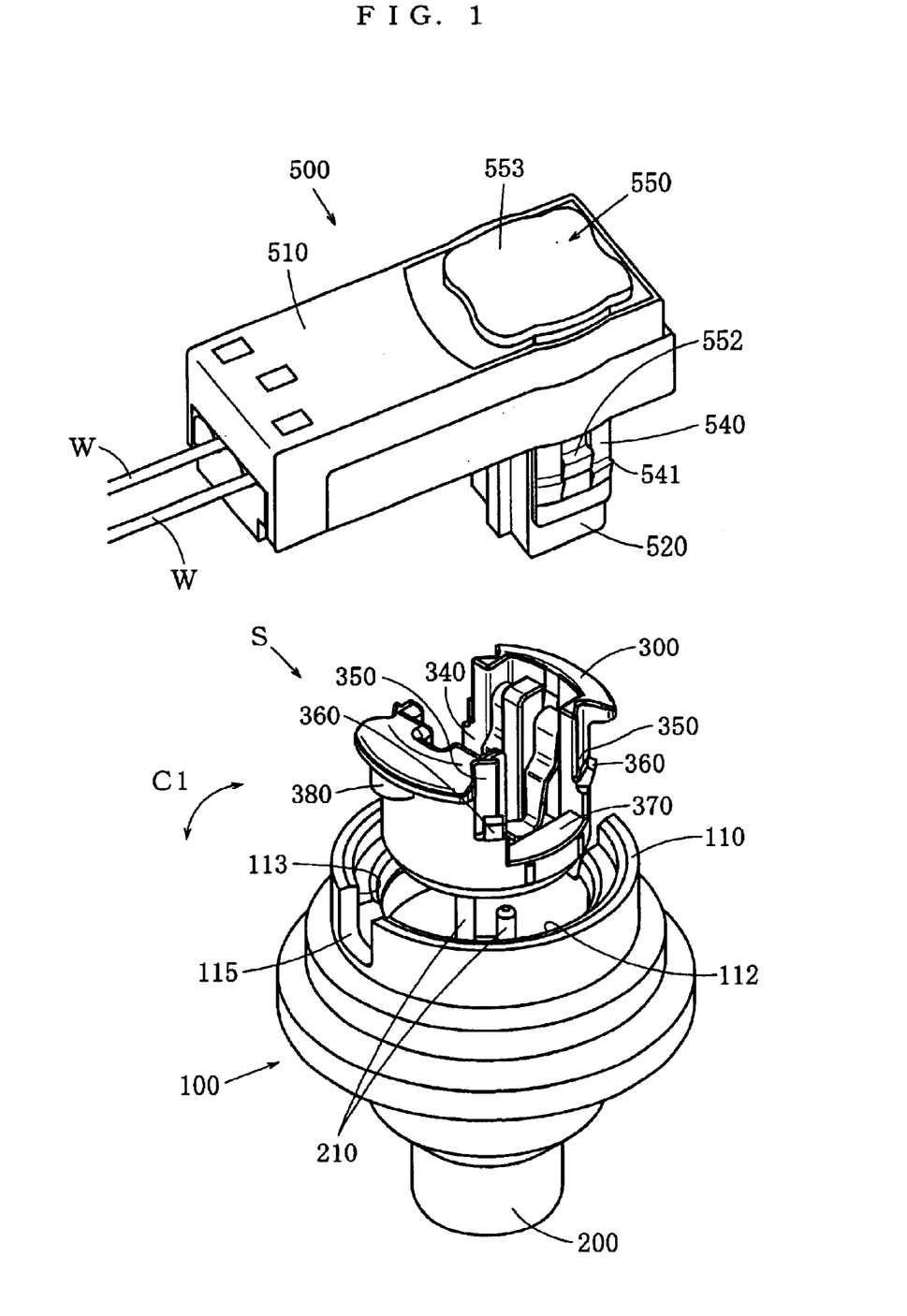
FIG. 1 is a perspective view separately showing a housing of an inflator, a shunt and a female connector of a first embodiment.

In the following, some embodiments of a shunt S of a squib according to the present invention will be described. FIG. 1 shows a shunt S of the first embodiment and members around it. 100 denotes a housing of an inflator. A squib 200, which receives electric energy to generate heat, is fixed inside the housing 100, and an igniter and a gas generator are arranged around the squib 200. An airbag in a deflated state is stored in the back of the inflator. When the squib 200 receives electric energy to generate heat, the igniter will be ignited, and it in turn will make the gas generator generate a gas, and the gas will deploy the airbag.

Figure 2:
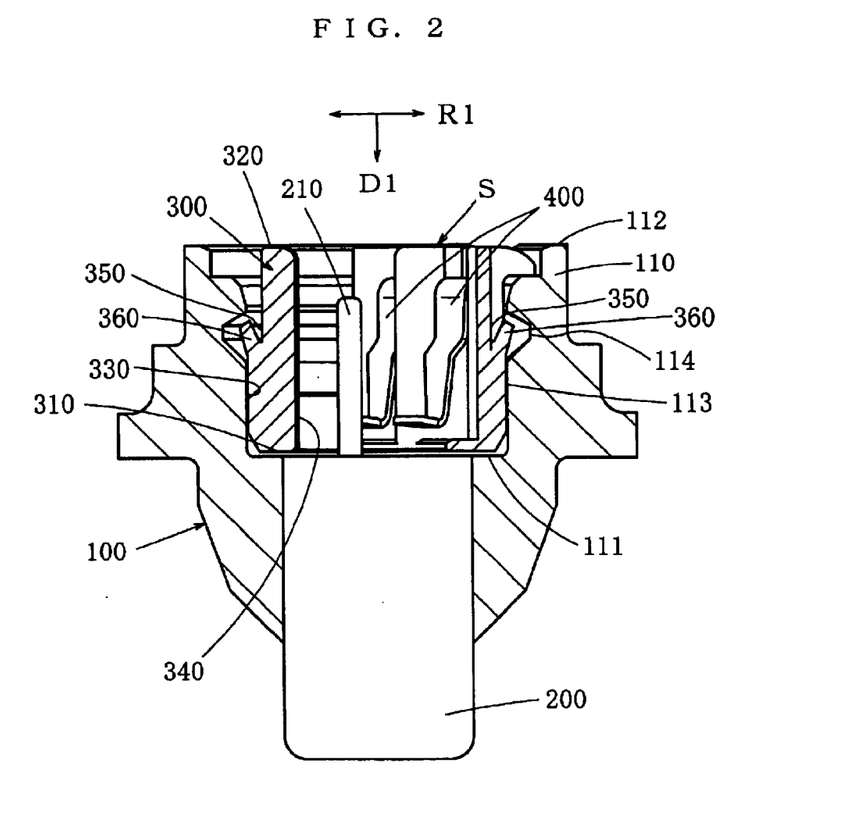
FIG. 2 is a sectional view showing the shunt fitted in the housing of the inflator of the first embodiment. They are sectioned by a plane containing the central axis of the socket. The squib is not sectioned.
Figure 3:
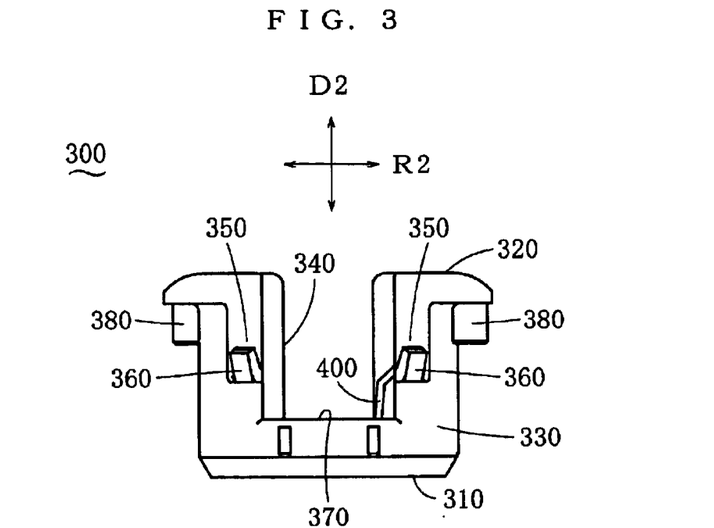
FIG. 3 is a front view of the shunt of the first embodiment.
Figure 4:
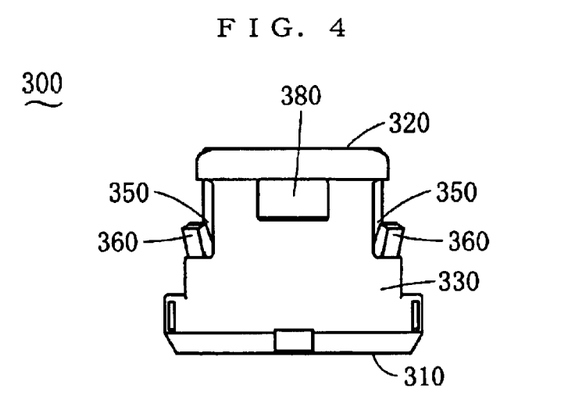
FIG. 4 is a side view of the shunt of the first embodiment.
Figure 5:
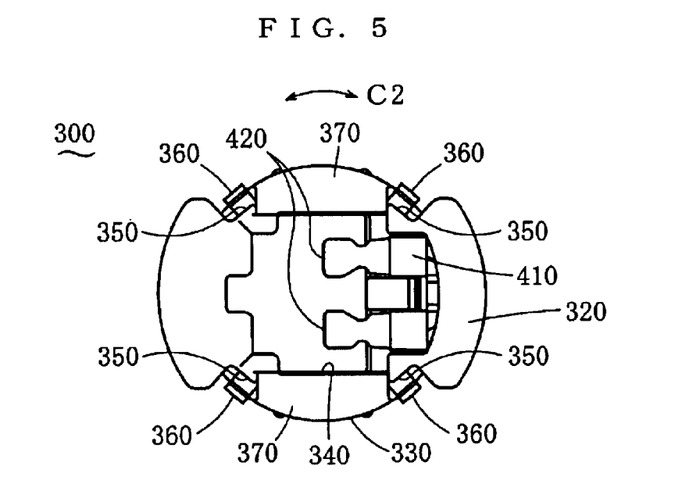
FIG. 5 is a plan view of the shunt of the first embodiment.
Figure 6:
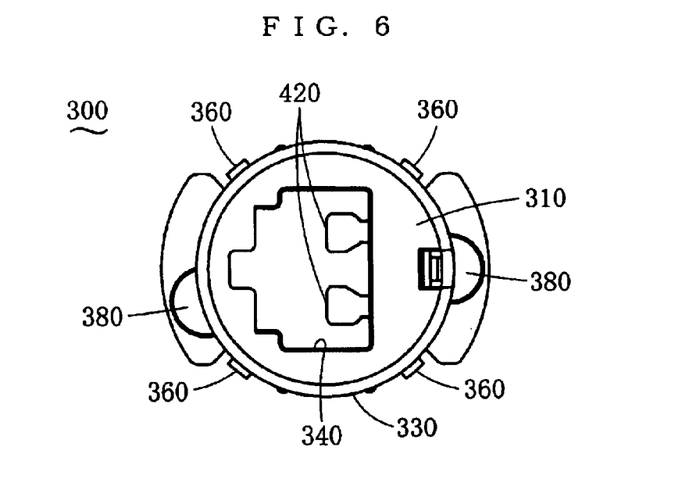
FIG. 6 is a bottom view of the shunt of the first embodiment.
Figure 7:
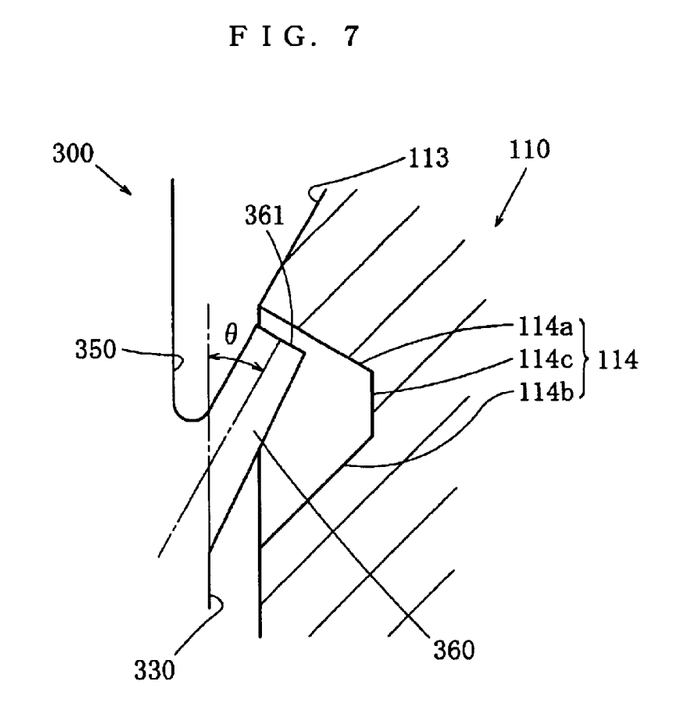
FIG. 7 is an enlarged view showing a protrusion of the shunt and a fitting concave of the socket of the first embodiment. The fitting concave is shown in section along a plane containing the central axis of the socket.

As shown in FIG. 1 and FIG. 2, the housing 100 of the inflator is provided with a socket 110. The socket 110 opens at the surface of the housing 100, and the socket 110 is cylindrically concaved into the housing 100 from this opening 112. As for the socket 110, a direction being parallel to the central axis of the cylinder and heading toward the inner side of the housing 100 is defined as the depth direction (D1 in FIG. 2), a direction along a radius of the cylinder is defined as a radial direction (R1 in FIG. 2), and a direction along the circumference of the cylinder is defined as a circumferential direction (C1 in FIG. 1), respectively. A fitting concave 114 is provided in an intermediate part in the socket 110 in its depth direction, the fitting concave 114 concaving outwardly in a radial direction from the inner circumferential face 113 thereof. The outward side of the radial direction is one wherein the radius increases along the radial direction. As shown in FIG. 2, in this embodiment, the fitting concave 114 is continuous in the circumferential direction and is in a shape of a groove. The fitting concave 114, however, may be discontinuous in the circumferential direction and in the shape of a hole. In such a case, the number of the fitting concaves 114 is discretionary. As shown in FIG. 2 and FIG. 7, the fitting concave 114 of the present embodiment is formed in such a way that the section of the fitting concave 114 is a trapezoid when the housing 100 is sectioned by a plane containing the central axis of the socket 110. This section is comprised of a first face 114a on a side close to the opening 112 of the socket 110, a second face 114b on a side distant from the opening 112 of the socket 110, and a third face 114c connecting the two faces 114a and 114b in the back. The first face 114a being the face on the side close to the opening 112 of the socket 110 is tilted in such a way that the face 114a comes closer to the central axis of the cylinder of the socket 110 as it gets closer to the opening 112. The present invention, however, does not limit in any way the sectional configuration of the fitting concave 114 to the above-mentioned configuration. For example, the present invention includes various embodiments such as one wherein the first face being on the side close to the opening of the socket and the second face being on the side distant from the opening of the socket are substantially parallel to each other and one wherein the sectional configuration is an arc. The squib 200 is fixed in the back of the socket 110 in the housing 100 of the inflator. A pair of pins 210 connecting to a heater contained therein protrude from the squib 200, and this pair of pins 210 rise at the center of the socket 110 from the bottom 111 thereof toward the opening 112 of the socket.

A shunt S fits into the socket 110, and this shunt S short-circuits the pair of pins 210 of the squib 200. As shown in FIG. 3 through FIG. 6, the shunt S comprises a shunt body 300 and a short-circuit piece 400 being provided in the shunt body 300.

The shunt body 300 is formed of an insulator into a cylindrical form so that it can fit into the socket 110. Any modifications to some extent are tolerated provided that the basic configuration is cylindrical. It will be described with reference to a direction along the central axis of the cylinder (D2 of FIG. 3), a direction along a radius of the cylinder (R2 of FIG. 3), and a direction along the circumference thereof (C2 of FIG. 5). A connection hole 340 being continuous from the bottom 310 to the top 320 along the central axis of the cylinder is provided at the center of the shunt body 300. The pair of pins 210 of the squib 200 enter the connection hole 340 from the bottom side. The top side of the connection hole 340 is formed into a configuration corresponding to a boss 520 of a female connector 500 so that the female connector, which will be described below, can fit into it.

The short-circuit piece 400 will contact the pair of pins 210 of the squib 200 when the shunt body 300 is fitted into the socket 110, and will be pushed by the female connector 500 to move away from the pair of pins 210 of the squib 200 when the female connector 500 is fitted into the connection hole 340. The short-circuit piece 400 is made of a conductor and one end thereof is fixed at a point close to the top 320 of the shunt body 300. Two contact pieces 420 being folded into an approximately L-shaped form are branched from one end 410 of the short-circuit piece 400, and these contact pieces 420 run toward the bottom 310 along the shunt body 300, and when the contact pieces 420 are flexed, the top ends of the contact pieces 420 will be displaced sidewise. When the shunt body 300 is fitted in the socket 110, the top ends of the two contact pieces 420 contact the pair of pins 210 respectively; thus both the pins 210 will be short-circuited via the short-circuit piece 400. When the boss 520 of the female connector 500 is fitted into the connection hole 340, the top ends of the contact pieces 420 will be pressed by the boss 520 of the female connector 500 to move away from the pair of pins 210 to break the continuity between both pins 210.

The shunt body 300 is provided with a protrusion 360 formed of a flexible material. Flexible materials include, for example, a resin. The protrusion 360 may be the same material as that of the shunt body 300, and the shunt body 300 and the protrusion 360 may be made integrally. In this embodiment, four protrusions 360 are provided in the circumferential direction at substantially regular intervals, but this does not limit the number nor arrangement of the protrusion 360 according to the present invention. The protrusion 360 is formed in a bar shape. The root end of the protrusion 360 is provided on the external face of the shunt body 300. As shown in FIG. 7, the protrusion 360 extends from its root end in a direction tilting toward the outside from the shunt body 300 at an angle θ which is within 90 degrees to a direction being parallel to the central axis of the shunt body 300 and heading toward the top 320. The outside means a side more distant from the central axis of the shunt body. In this case, the outside may be the outside in the radial direction or the outside of an axis having an angle to the radial direction seen from the direction of the central axis. It is arranged so that when the top end of the protrusion 360 is pushed toward the connection hole 340 of the shunt body 300, the protrusion 360 will be bent and deformed, and when the shunt body 300 is fitted into the socket 110, the protrusion 360 will restitute and protrude in the fitting concave 114.

The shunt body 300 is provided with an accommodating concave 350 which concaves from the outer circumferential face 330 toward the connection hole 340. The accommodating concave 350 is provided to accommodate at least a part of the protrusion 360 when the protrusion 360 is bent and deformed toward the connection hole 340. The root end of the protrusion 360 is provided in this accommodating concave 350. It is arranged so that when the top end of the protrusion 360 is pushed toward the connection hole 340 of the shunt body 300, the protrusion 360 will be bent and deformed to shunt into the accommodating concave 350.

As shown in FIG. 7, the top end of the protrusion 360 is provided with a restraining face 361, which contacts or faces the first face 114a being close to the opening 112 of the socket 110 among the faces constituting the fitting concave 114 when the shunt body 300 is fitted in the socket 110.

Figure 8:
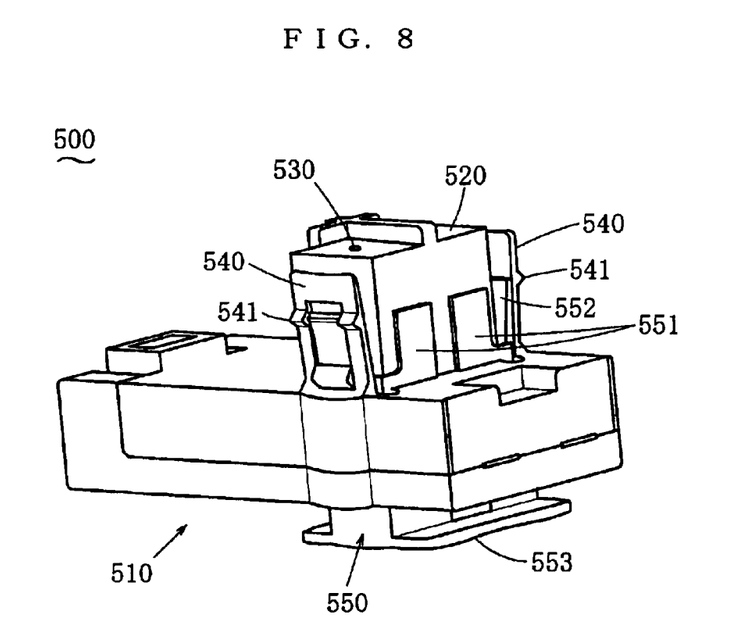
FIG. 8 is a perspective view of the female connector.
Figure 9:
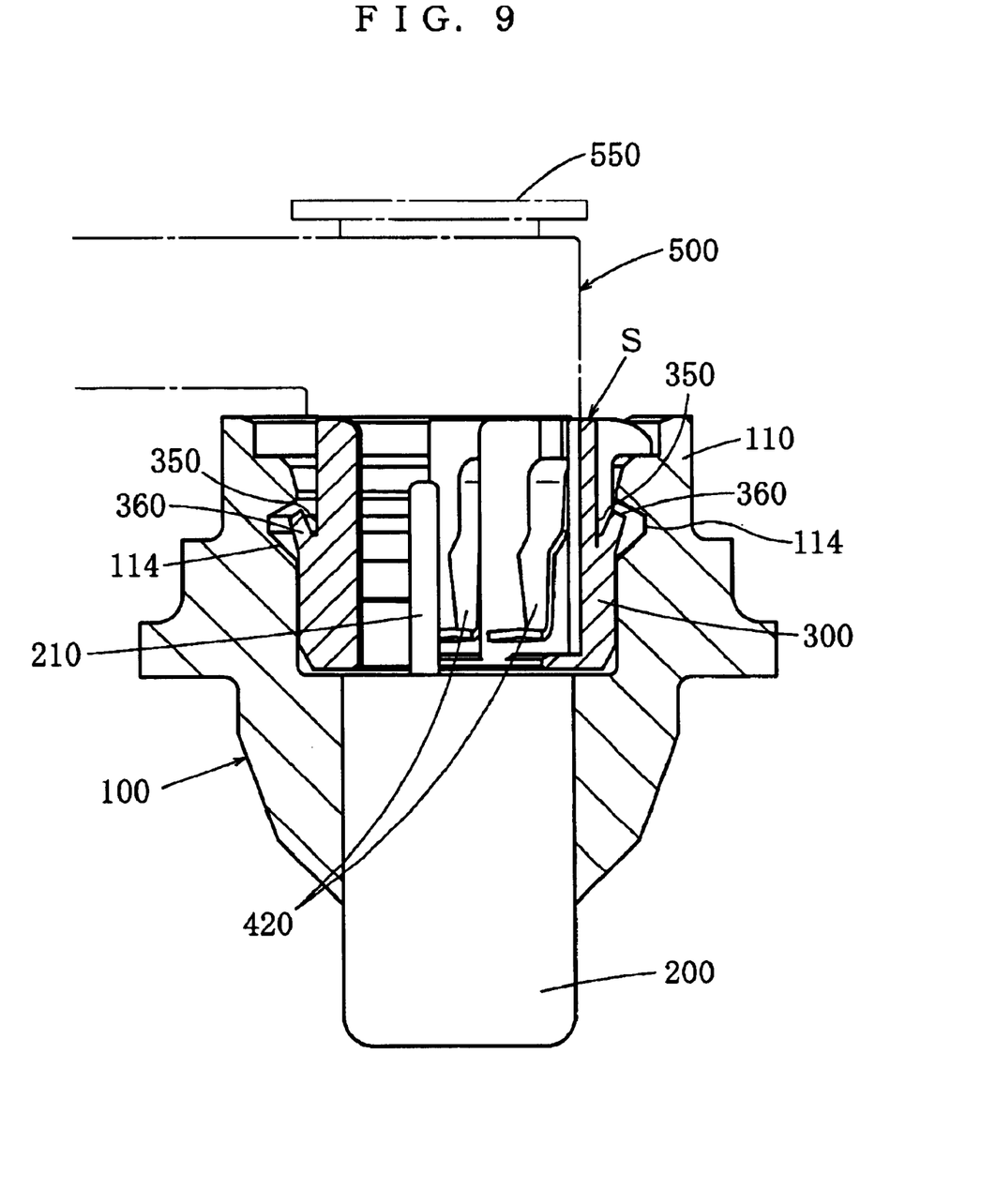
FIG. 9 is a sectional view showing the shunt fitted in the housing of the inflator of the first embodiment. They are sectioned by a plane containing the central axis of the socket. The squib is not sectioned. The female connector is fitted in the shunt, and a part of the female connector, which is out of the shunt, is shown by an imaginary line.

As shown in FIG. 1, FIG. 8 and FIG. 9, the female connector 500 comprises a box-shaped connector body 510, a square-pillar-shaped boss 520 protruding from the bottom of the connector body 510, and contacts 530 being provided inside the connector body 510 and the boss 520 and opening a connecting port in the top end of the boss 520. An electric wire W is connected to the contact 530, and the electric wire W is connected to a control means which transmits electric energy to the squib 200. Moreover, the female connector 500 is provided fitting pieces 540 protruding from the connector body 510 on both sides of the boss 520. A pawl protruding outward is provided on the top end of the fitting piece 540. The female connector 500 is also provided with a slider 550 which penetrates through the connector body 510 and slides along the boss 520. The slider 550 is provided with first wedges 551, which move up and down along the front face of the boss 520, the front face being to face the contact pieces 420 when the boss 520 is fitted in the connection hole 340, and with second wedges 552, which move up and down between the boss 520 and the fitting pieces 540 and are partly exposed through windows made in the fitting pieces 540. The top of the slider 550 coming out of the top of the connector body 510 is formed into a plane to provide a button 553. The female connector may have a variety of constructions. For example, a female connector 500 wherein the fitting pieces 540 are separated from the connector body 510 and made integral with the second wedges 552 may be used. In this case, when the button 553 is depressed, the fitting pieces 540, first wedges 551 and second wedges 552 will be slid simultaneously. The shunt according to the present invention is applicable to female connectors of simpler configurations which are not provided with any or all of the pawls, fitting pieces, slider, wedges, button, etc.

The shunt body 300 is provided with two U-shaped notches 370 being located to oppose to each other across the central axis of the shunt body 300. When the female connector 500 is fitted in the shunt body 300, the fitting pieces 540 of the female connector 500 will fit into the notches 370. The present invention includes shunt embodiments being not provided such a notch.

380 denotes two bosses provided on the outside of the shunt body 300, and 115 denotes cavities concavely formed in the circumference of the opening 112 of the socket 110; the shunt body 300 is prevented from turning by fitting the bosses 380 into the cavities 115. The present invention includes shunt embodiments wherein the shunt body is not provided with such a boss and shunt embodiments wherein the shunt is designed for a socket having no such cavity.

The operation and effects of the shunt S of the first embodiment will be described. As shown in FIG. 9, when this shunt body 300 is fitted into the socket 110, the pair of pins 210 of the squib 200 will enter the connection hole 340 from the bottom side. At the time, as the short-circuit piece 400 contacts both pins 210 to short-circuit them, the squib will not function. When the female connector 500 is fitted into the connection hole 340 from the top side, the short-circuit piece 400 will be pushed by the female connector 500 to move away from the pair of pins 210, and the female connector 500 will connect to the pair of pins 210, making the operating circuit of the squib 200 alive and making the inflator operable. In other words, with the slider 550 being raised to the top side of the connector body 510, when the boss 520 of the female connector 500 is fitted into the connection hole 340, the contact 530 of the female connector 500 will contact the pair of pins 210, and the pawls 541 of the fitting pieces 540 will be hooked over the fitting concaves 114 of the socket 110. Next, when the button 553 is pressed to slide the slider 550 to the top end side of the boss 520, the first wedges 551 will push the contact pieces 420 outward, and the contact pieces 420 will move outward, and in turn the contact pieces 420 will move away from the pair of pins 210, making alive the operating circuit of the squib 200. Moreover, as the second wedges 552 will push the fitting pieces 540 of the female connector 500 outward, the pawls 541 of the fitting pieces 540 will be hooked heavily over the fitting concaves 114 of the socket 110.

Figure 14:
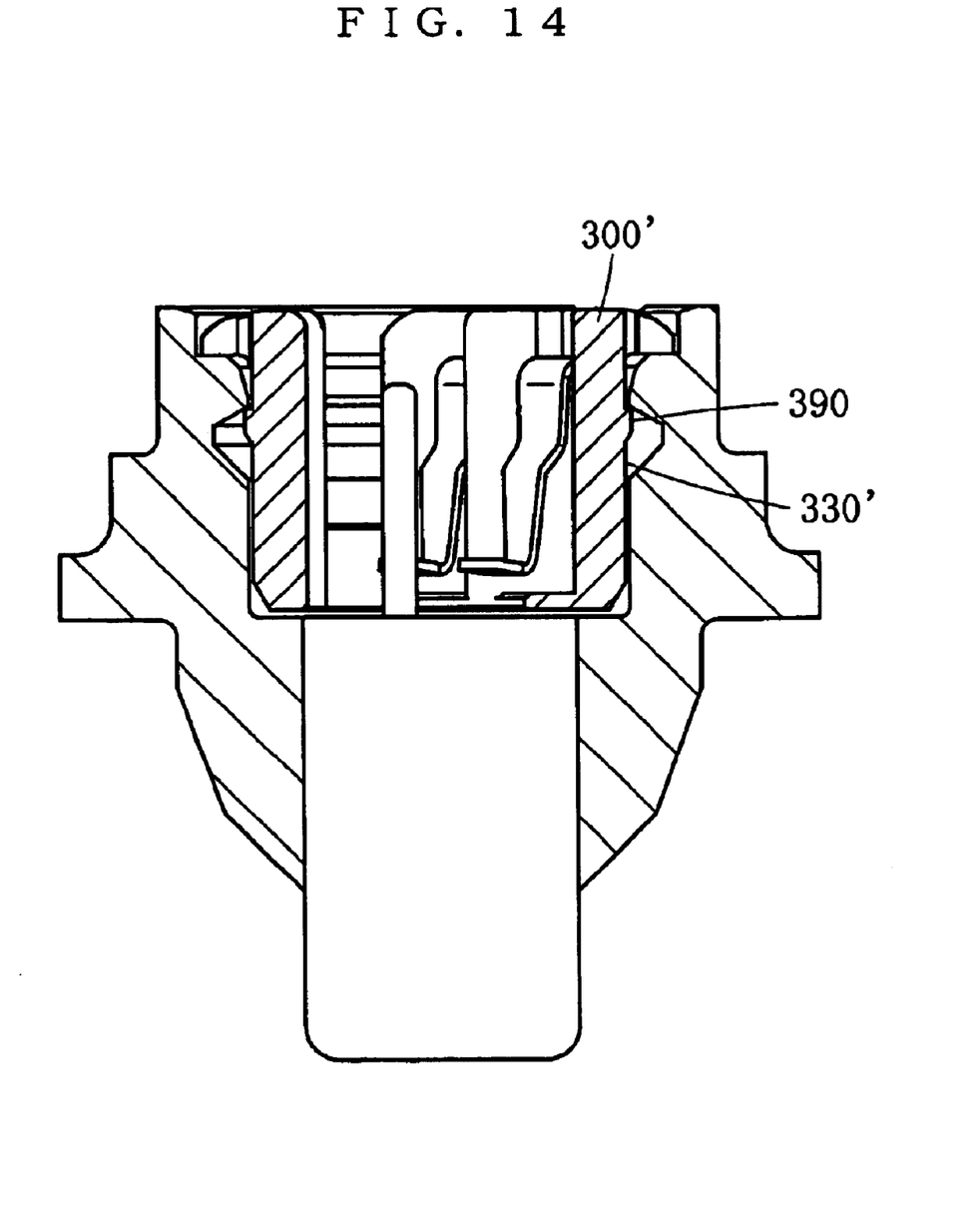
FIG. 14 is a sectional view showing a shunt of a comparative example. It is fitted in a housing of an inflator and sectioned in a plane containing the central axis of the socket. The squib is not sectioned.

To fit the shunt S in the socket 110, when the shunt body 300 is inserted into the socket 110, the top ends of the protrusions 360 will be pushed by the inner circumferential face 113 of the socket 110 toward the connection hole 340 of the shunt body 300, and the protrusions 360 will be bent and deformed to shunt toward the connection hole 340. In this case, as the protrusions are deformed by bending, greater displacement of the top ends thereof can be obtained by a small force when compared with the comparative case of FIG. 14 wherein a swelled part 390 and a shunt body 300' are deformed by compression. Accordingly, when compared with a case wherein the swelled part 390 is provided on the outer circumferential face 330' of the shunt body 300', the frictional forces working on the protrusions 360 and the inner circumferential face 113 of the socket 110 are reduced. As a result, the force required to insert the shunt S into the socket 110 will be reduced, and the workability of fitting the shunt S into the socket 110 will be enhanced.

When the shunt body 300 is fitted in the socket 110, the protrusion 360 will restitute and protrude, with a sufficient length, in the fitting concave 114. Moreover, as the frictional forces working on the protrusions 360 and the inner circumferential face 114 of the socket 110 are reduced, gnawing of the protrusions 360 will be reduced. Accordingly, when compared with the comparative case of FIG. 14, the depth of fitting between the protrusion 360 and the fitting concave 114 is sufficiently large, and in turn, the strength of holding the shunt S by the inflator is improved, and disconnection of the shunt S from the inflator can be prevented reliably.

When the protrusion 360 protrudes into the fitting concave 114, the top end of the protrusion 360 will undergo a large deformation as the protrusion 360 restitutes itself from a deformed state by bending. Hence when compared with the comparative case of FIG. 14, a conspicuous response will be experienced with a clear sense of clicking. As a result, it is easier to verify that the protrusion 360 has been fitted into the fitting concave 114; it will be hard to leave the fitting work half done or unfinished. Accordingly, the force of holding the shunt S by the inflator is enhanced, and disconnection of the shunt S from the inflator can be prevented reliably.

Figure 10:
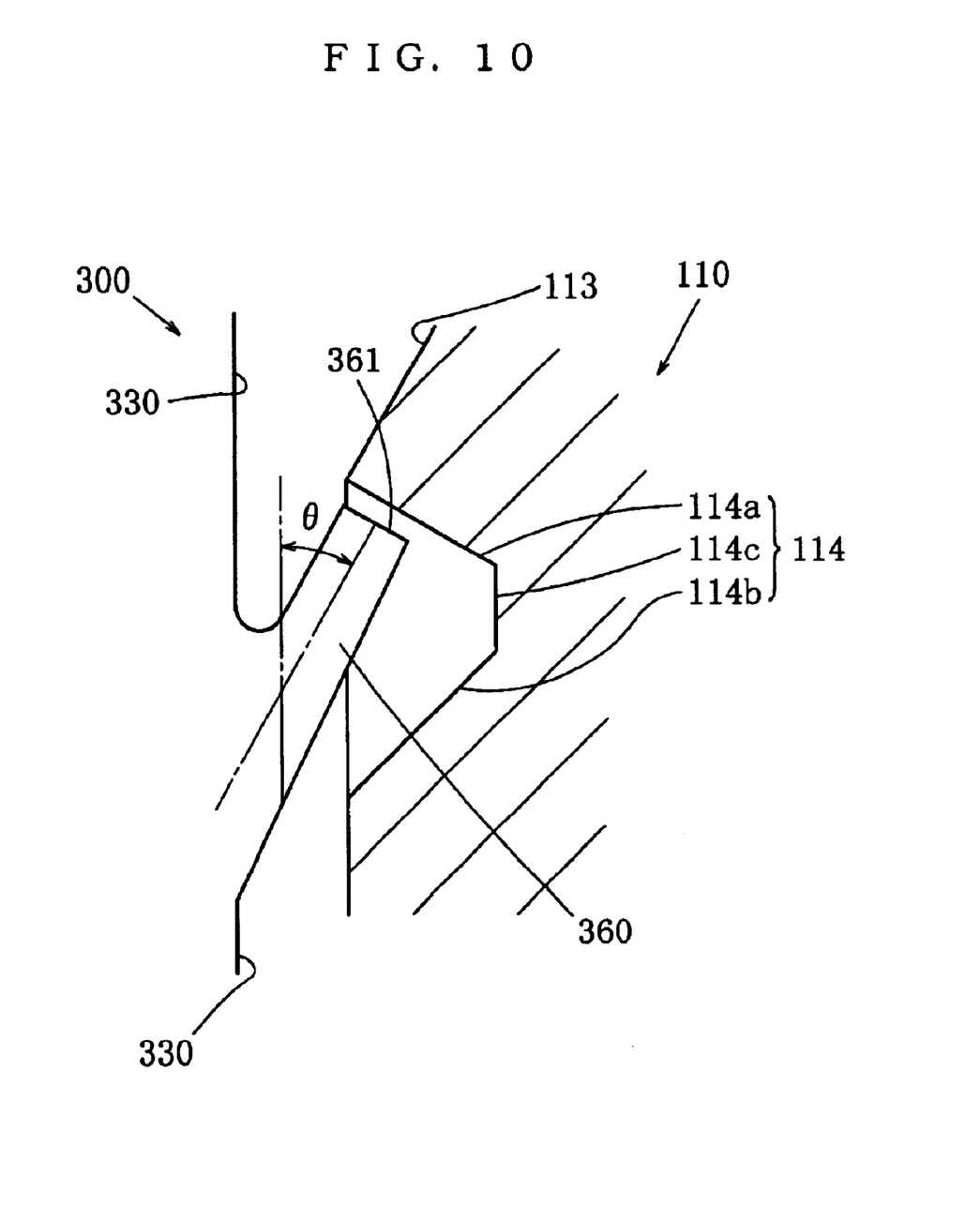
FIG. 10 is an enlarged view showing a protrusion of a shunt and a fitting concave of a socket of a second embodiment. The fitting concave is shown in section along a plane containing the central axis of the socket.

It should be noted that as for the protrusion of the shunt according to the present invention it is sufficient that the root end thereof is provided on the outer face of the shunt body. Hence the present invention includes an embodiment wherein the root end of the protrusion 360 is provided on the outer circumferential face 330 of the shunt body 300, like the shunt of the second embodiment shown in FIG. 10. On the other hand, in the first embodiment, the shunt body 300 is provided with the accommodating concave 350 which concaves from the outer circumferential face 330, and the root end of the protrusion 360 is provided in the accommodating concave 350, and it is arranged that when the top end of the protrusion 360 is pushed toward the connection hole 340 of the shunt body 300, the protrusion 360 will undergo deformation by bending to shunt into the accommodating concave 350. With this arrangement, when the top end of the protrusion 360 is pushed by the inner circumferential face 113 of the socket 110 toward the connection hole 340 of the shunt body 300, the protrusion 360 will undergo deformation by bending to shunt into the accommodating concave 350. Accordingly, even if the gap between the outer circumferential face 330 of the shunt body 300 and the inner circumferential face 113 of the socket 110 is small, the shunt body 300 can be fitted into the socket 110.

The present invention does not limit the configuration of the top end of the protrusion. Hence the present invention includes embodiments wherein the protrusion is formed to have a round top end like a hemisphere and embodiments wherein the top end is formed to be pointed. On the other hand, the top end of the protrusion 360 of the first embodiment is provided with the restraining face 361, which contacts or faces the first face 114a being close to the opening 112 of the socket 110 among the faces constituting the fitting concave 114 when the shunt body 300 is fitted in the socket 110. With this arrangement, even if the shunt body 300 tends to come out of the socket 110 after the shunt body 300 has been fitted into the socket 110, the restraining face 361 of the protrusion 360 will contact the first face 114a of the fitting concave 114 to hold. Hence the force to hold the shunt S by the inflator is more enhanced, and disconnection of the shunt S from the inflator is prevented more reliably.

Figure 11:
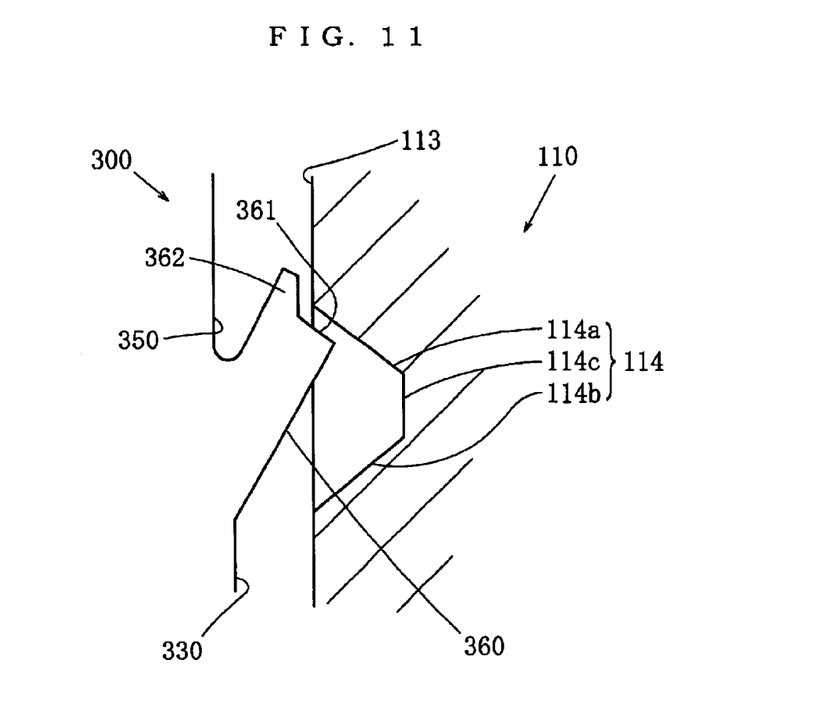
FIG. 11 is an enlarged view showing a protrusion of a shunt and a fitting concave of a socket of a third embodiment. The fitting concave is shown in section along a plane containing the central axis of the socket.

FIG. 11 shows a protrusion 360 of a shunt S of the third embodiment. This shunt S differs from the first embodiment only in the configuration of the protrusion 360. In this shunt S, a stopper 362 is provided protrusively on the inner side of the top end of the protrusion 360; when the shunt body 300 fits into the socket 110, the stopper 362 will contact the socket inner circumferential face 113 which is closer to the opening 112 of the socket 110 than the fitting concave 114. With this arrangement, even if the shunt body 300 tends to come out of the socket 110 after the shunt body 300 has been fitted into the socket 110, the restraining face 361 at the top end of the protrusion 360 will contact the first face 114a being a face constituting the fitting concave 114 to hold the shunt body 300 in the socket 110, and moreover, the stopper 362 will contact the socket inner circumferential face 113. Hence the force to hold the shunt S by the inflator is enhanced more, and the protrusion 360 is prevented from excessive deformation. Furthermore, as the stopper 362 contacts the socket inner circumferential face 113 this increases the feel or response, giving a greater sense of clicking. As a result, it is easier to verify that the protrusion 360 has been fitted into the fitting concave 114; it more reliably prevents leaving the fitting work half done. Accordingly, the force of holding the shunt S by the inflator is enhanced further, and disconnection of the shunt S from the inflator can be prevented more reliably.

Figure 12:
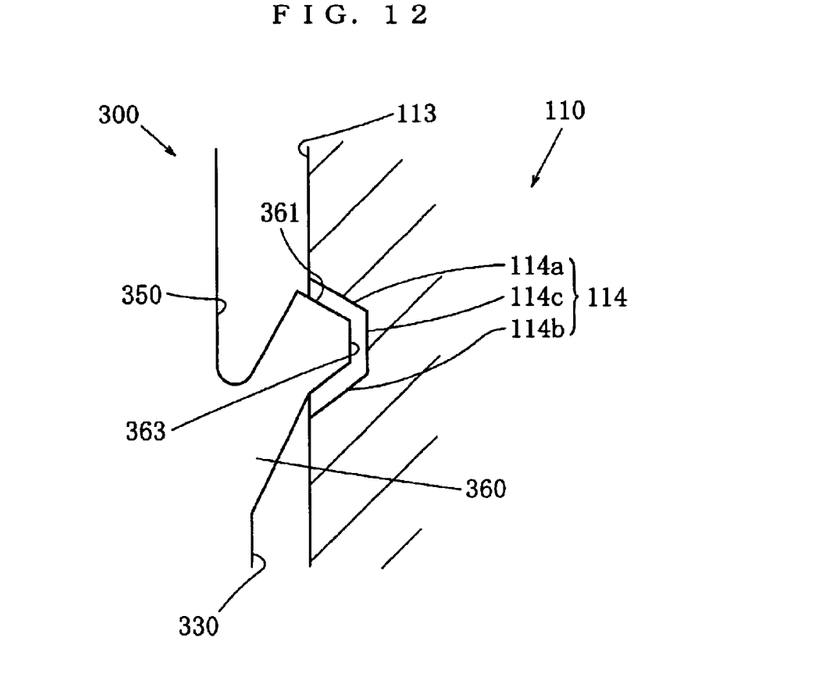
FIG. 12 is an enlarged view showing a protrusion of a shunt and a fitting concave of a socket of a fourth embodiment. The fitting concave is shown in section along a plane containing the central axis of the socket.

FIG. 12 shows a protrusion 360 of a shunt S of the fourth embodiment. This shunt S differs from that of the first embodiment only in the configuration of the protrusion. In this shunt S, a stopper 363 is provided on the outer side of the top end of the protrusion 360; when the shunt body 300 fits into the socket 110, the stopper 363 will contact the inner part of the fitting concave 114. In this embodiment, the inner part is exemplified by the third face 114c among the faces constituting the fitting concave 114. The inner part means an outer part of the fitting concave 114 in the radial direction of the socket, and is not limited to the third face 114c of the fitting concave 114 of this embodiment. With this arrangement, even if the shunt body 300 tends to come out of the socket 110 after the shunt body 300 has been fitted into the socket 110, the top end of the protrusion 360 will contact the first face 114a being a face constituting the fitting concave 114 to hold, and moreover, the stopper 363 will contact the third face 114c being the inner part of the fitting concave 114. Hence the force to hold the shunt S by the inflator is enhanced more, and the protrusion 360 is prevented from excessive deformation. Furthermore, as the stopper 363 contacts the third face 114c being an inner part of the fitting concave 114 to increase the feel or response, giving a greater sense of clicking. As a result, it is easier to verify that the protrusion 360 has been fitted into the fitting concave 114; it more reliably prevents leaving the fitting work half done. Accordingly, the force of holding the shunt S by the inflator is enhanced further, and disconnection of the shunt S from the inflator can be prevented more reliably.

Figure 13:
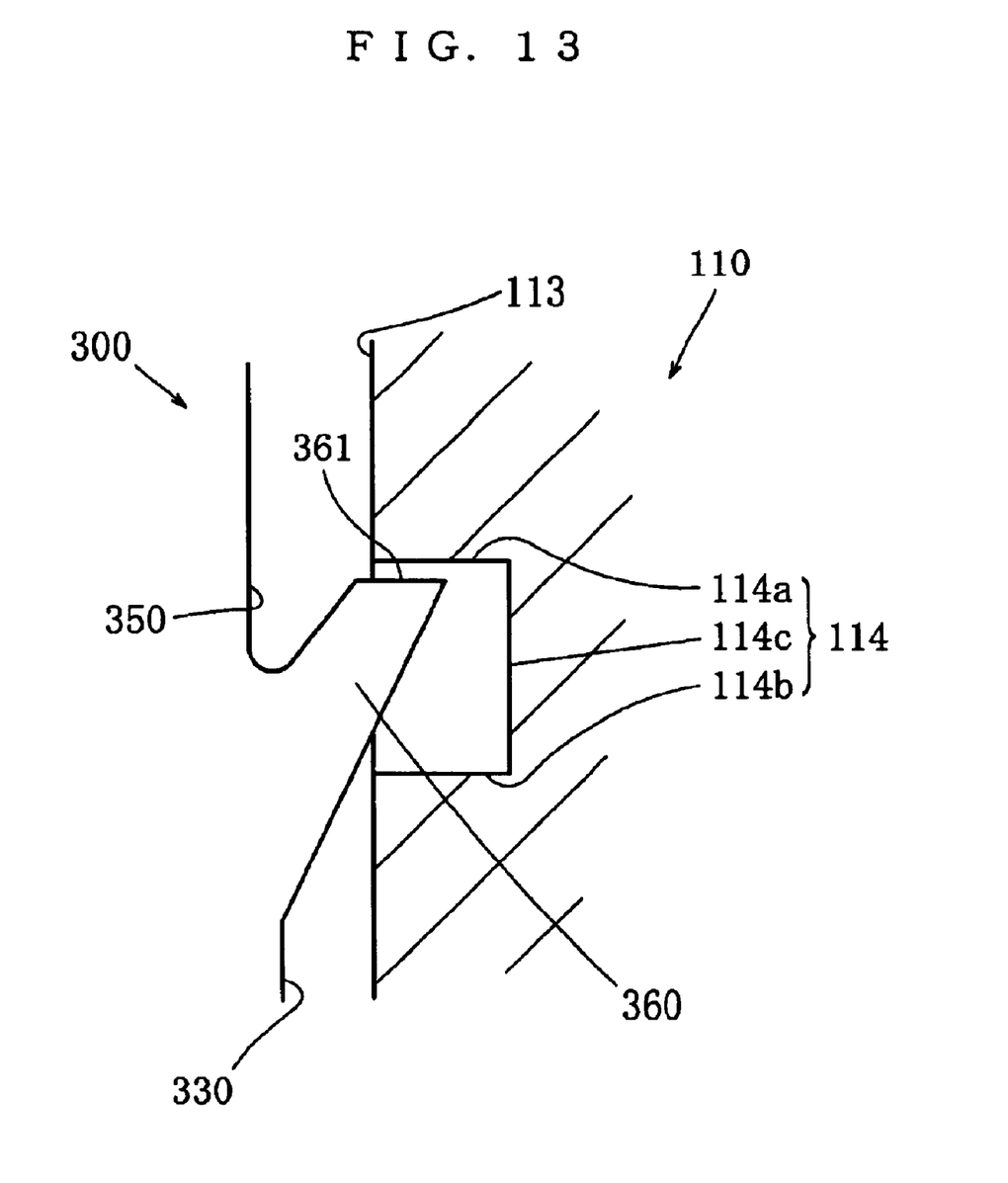
FIG. 13 is an enlarged view showing a protrusion of a shunt and a fitting concave of a socket of a fifth embodiment. The fitting concave is shown in section along a plane containing the central axis of the socket.

FIG. 13 shows a protrusion 360 of a shunt S of the fifth embodiment. This shunt S differs from that of the first embodiment only in the configuration of the protrusion 360. In this embodiment, of the faces 114a, 114b and 114c constituting the fitting concave 114, the first face 114a being the face closer to the opening 112 of the socket 110 is formed to be perpendicular to the central axis of the cylinder of the socket 110. The restraining face 361 at the top end of the protrusion 360 of this shunt S is formed to be parallel to the first face 114a constituting the fitting concave 114.

With the description of these embodiments, the first shunt for squib which was described in the Summary of the Invention has been fully disclosed. Moreover, with the description of these embodiments, the second shunt for squib through the fifth shunt for squib, which will be described below, have been fully described.

The second shunt for squib is the first shunt for squib, wherein the shunt body is provided with an accommodating concave concaving from the outer circumferential face, the root end of the protrusion is provided in the accommodating concave, and it is arranged that when the top end of the protrusion is pushed toward the connection hole of the shunt body, the protrusion will undergo deformation by bending to shunt into the accommodating concave.

With this arrangement, when the top end of the protrusion is pushed by the inner circumferential face of the socket toward the connection hole of the shunt body, the protrusion will undergo deformation by bending to shunt into the accommodating concave. Accordingly, even if the gap between the outer circumferential face of the shunt body and the inner circumferential face of the socket is small, the shunt body can be fitted into the socket.

The third shunt for squib is the first or second shunt for squib, wherein the top end of the protrusion is provided with a restraining face which contacts or faces toward the face closer to the opening of the socket among the faces constituting the fitting concave when the shunt body is fitted into the socket.

With this arrangement, even if the shunt body tends to come out of the socket after the shunt body has been fitted into the socket, the restraining face of the protrusion will contact the face closer to the opening of the socket among the faces constituting the fitting concave to hold. Hence the force to hold the shunt by the inflator is enhanced further, and the shunt is more reliably prevented from coming off from the inflator.

The fourth shunt for squib is any of the first through third shunts for squib, wherein a stopper is protrusively provided on the inner side of the top end of the protrusion, the stopper contacts the socket inner circumferential face being closer to the opening of the socket than the fitting concave when the shunt body is fitted into the socket.

With this arrangement, even if the shunt body tends to come out of the socket after the shunt body has been fitted into the socket, the top end of the protrusion will contact a face constituting the fitting concave to hold and moreover the stopper will contact the stopper inner circumferential face. Hence the force to hold the shunt by the inflator is enhanced more, and the protrusion is prevented from excessive deformation. Contacting the socket inner circumferential face by the stopper increases the response and a greater sense of clicking will be experienced. As a result, it is easier to verify that the protrusion has been fitted into the fitting concave; it prevents more reliably leaving the fitting work half done. Accordingly, the force of holding the shunt by the inflator is more enhanced, and disconnection of the shunt from the inflator can be prevented more reliably.

The fifth shunt for squib is any of the first through fourth shunts for squib, wherein a stopper is provided on the outer side of the top end of the protrusion, the stopper contacts the inner part of the fitting concave when the shunt body is fitted into the socket.

With this arrangement, even if the shunt body tends to come out of the socket after the shunt body has been fitted into the socket, the top end of the protrusion will contact a face constituting the fitting concave to hold and moreover the stopper will contact the inner part of the fitting concave. Hence the force to hold the shunt by the inflator is enhanced more, and the protrusion is prevented from excessive deformation. Contacting the inner part of the fitting concave by the stopper increases the response and a greater sense of clicking will be experienced. As a result, it is easier to verify that the protrusion has been fitted into the fitting concave; it more reliably prevents leaving the fitting work half done.

Accordingly, the force of holding the shunt by the inflator is more enhanced, and disconnection of the shunt from the inflator can be prevented more reliably.

What is claimed is:

1. A shunt for squib that fits into a socket opening in the surface of a housing of an inflator, concaving from the opening in a cylindrical form into the housing and having a fitting concave concaving from the inner circumferential face, in the middle of the depth direction, to the outer side of the radial direction, and short-circuits a pair of pins of a squib rising from the bottom of the socket, the shunt comprising a shunt body being formed into a cylinder to fit into the socket and being provided, at the center thereof, with a through connection hole into which the pair of pins of the squib enter from the bottom side and a female connector fits from the top side, a short-circuit piece being provided to the shunt body to contact the pair of pins of the squib when the shunt body is fitted into the socket and to be pushed by the female connector to move away from the pair of pins of the squib when the female connector is fitted into the connection hole, and a protrusion being formed of an elastic material and provided on the shunt body, and the root end of the protrusion is provided on the outer face of the shunt body, the protrusion extends from the root end thereof in a direction tilting toward the outside from the shunt body at an angle within 90 degrees to a direction being parallel to the central axis of the shunt body and heading toward the top thereof, and it is arranged that when the top end of the protrusion is pushed toward the connection hole of the shunt body, the protrusion will undergo deformation by bending, and when the shunt body fits into the socket, the protrusion will restitute to protrude in the fitting concave.

2. The shunt for squib as recited in claim 1, wherein the shunt body is provided with an accommodating concave concaving from the outer circumferential face, the root end of the protrusion is provided in the accommodating concave, and it is arranged that when the top end of the protrusion is pushed toward the connection hole of the shunt body, the protrusion will undergo deformation by bending to shunt into the accommodating concave.

3. The shunt for squib as recited in claim 1, wherein the top end of the protrusion is provided with a restraining face which contacts or faces toward the face closer to the opening of the socket among the faces constituting the fitting concave when the shunt body is fitted into the socket.

4. The shunt for squib as recited in claim 2, wherein the top end of the protrusion is provided with a restraining face which contacts or faces toward the face closer to the opening of the socket among the faces constituting the fitting concave when the shunt body is fitted into the socket.

5. The shunt for squib as recited in claim 1, wherein a stopper is protrusively provided on the inner side of the top end of the protrusion, the stopper contacts the socket inner circumferential face being closer to the opening of the socket than the fitting concave when the shunt body is fitted into the socket.

6. The shunt for squib as recited in claim 2, wherein a stopper is protrusively provided on the inner side of the top end of the protrusion, the stopper contacts the socket inner circumferential face being closer to the opening of the socket than the fitting concave when the shunt body is fitted into the socket.

7. The shunt for squib as recited in claim 3, wherein a stopper is protrusively provided on the inner side of the top end of the protrusion, the stopper contacts the socket inner circumferential face being closer to the opening of the socket than the fitting concave when the shunt body is fitted into the socket.

8. The shunt for squib as recited in claim 4, wherein a stopper is protrusively provided on the inner side of the top end of the protrusion, the stopper contacts the socket inner circumferential face being closer to the opening of the socket than the fitting concave when the shunt body is fitted into the socket.

9. The shunt for squib as recited in claim 1, wherein a stopper is provided on the outer side of the top end of the protrusion, the stopper contacts the inner part of the fitting concave when the shunt body is fitted into the socket.

10. The shunt for squib as recited in claim 2, wherein a stopper is provided on the outer side of the top end of the protrusion, the stopper contacts the inner part of the fitting concave when the shunt body is fitted into the socket.

11. The shunt for squib as recited in claim 3, wherein a stopper is provided on the outer side of the top end of the protrusion, the stopper contacts the inner part of the fitting concave when the shunt body is fitted into the socket.

12. The shunt for squib as recited in claim 4, wherein a stopper is provided on the outer side of the top end of the protrusion, the stopper contacts the inner part of the fitting concave when the shunt body is fitted into the socket.

13. The shunt for squib as recited in claim 5, wherein a stopper is provided on the outer side of the top end of the protrusion, the stopper contacts the inner part of the fitting concave when the shunt body is fitted into the socket.

14. A shunt for squib as recited in claim 6, wherein a stopper is provided on the outer side of the top end of the protrusion, the stopper contacts the inner part of the fitting concave when the shunt body is fitted into the socket.

15. The shunt for squib as recited in claim 7, wherein a stopper is provided on the outer side of the top end of the protrusion, the stopper contacts the inner part of the fitting concave when the shunt body is fitted into the socket.

16. The shunt for squib as recited in claim 8, wherein a stopper is provided on the outer side of the top end of the protrusion, the stopper contacts the inner part of the fitting concave when the shunt body is fitted into the socket.

17. A shunt for a squib adapted to fit into a socket opening of an inflator housing that has a concave recess in an inner circumferential wall bounding said socket opening, wherein said shunt comprises:

a shunt body configured to be inserted into said socket opening with a front end of said shunt body penetrating into said socket opening and a rear end of said shunt body facing out of said socket opening, and having a hole therein adapted to receive a female connector fitted therein; and a protrusion formed of an elastic material and protruding radially outwardly away from said shunt body at an acute angle relative to a central axis of said shunt body with a vertex of said acute angle oriented toward said front end of said shunt body;

wherein said protrusion is configured and arranged to be elastically deflected toward said central axis of said shunt body by contacting said inner circumferential wall as said shunt body is being inserted into said socket opening, and to restitute elastically outwardly to protrude and engage into said concave recess when insertion of said shunt body into said socket opening is completed.

18. An electrical connection arrangement comprising:

a component having a socket recessed into an outer surface thereof, having a concave recess in an inner circumferential wall bounding said socket, and having two electrical contact pins located in said socket and protruding in a direction of a central axis of said arrangement from a socket floor of said socket toward said outer surface of said component;

a shunt comprising a shunt body that includes an annular wall which bounds a fitting hole therein, and that is dimensioned and shaped to be fitted into said socket with said pins protruding into said fitting hole, and further comprising an electrically conductive short-circuit piece which contacts and short-circuits said pins when said shunt body is fitted into said socket, and a protrusion formed of an elastic material and protruding radially outwardly away from said shunt body at an acute angle relative to said central axis with a vertex of said acute angle oriented into said socket, wherein said protrusion is configured and arranged to be elastically deflected toward said central axis by contacting said inner circumferential wall as said shunt body is being inserted into said socket, and to restitute elastically outwardly to protrude and engage into said concave recess when insertion of said shunt body into said socket is completed; and an electrical connector plug dimensioned and shaped to be plugged in said direction of said central axis into said fitting hole of said shunt body which is fitted into said socket, with said pins being received in an opening of said plug, and further including a configuration that is shaped and positioned to deflect said short-circuit piece out of electrical contact with at least one of said pins when said plug is plugged into said fitting hole.

* * * * *